United States Patent
Yajima et al.

(10) Patent No.: US 10,270,118 B2
(45) Date of Patent: Apr. 23, 2019

(54) SOLID OXIDE FUEL CELL

(71) Applicant: NISSAN MOTOR CO., LTD., Yokohama-shi, Kanagawa (JP)

(72) Inventors: Kentarou Yajima, Kanagawa (JP); Takao Izumi, Kanagawa (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 0 days.

(21) Appl. No.: 15/576,145

(22) PCT Filed: May 25, 2015

(86) PCT No.: PCT/JP2015/064903
§ 371 (c)(1),
(2) Date: Nov. 21, 2017

(87) PCT Pub. No.: WO2016/189620
PCT Pub. Date: Dec. 1, 2016

(65) Prior Publication Data
US 2018/0166729 A1 Jun. 14, 2018

(51) Int. Cl.
*H01M 8/2432* (2016.01)
*H01M 8/1213* (2016.01)
*H01M 8/2425* (2016.01)
*H01M 8/0297* (2016.01)
*H01M 8/124* (2016.01)

(52) U.S. Cl.
CPC ....... *H01M 8/2432* (2016.02); *H01M 8/0297* (2013.01); *H01M 8/1213* (2013.01); *H01M 8/2425* (2013.01); *H01M 2008/1293* (2013.01)

(58) Field of Classification Search
CPC ....... H01M 2008/1293; H01M 8/0297; H01M 8/1213; H01M 8/2425; H01M 8/2432
See application file for complete search history.

(56) References Cited

U.S. PATENT DOCUMENTS

| | | | |
|---|---|---|---|
| 6,045,935 A | 4/2000 | Ketcham et al. | |
| 2002/0177026 A1 | 11/2002 | Hatano et al. | |
| 2003/0104268 A1 | 6/2003 | Shibata et al. | |
| 2004/0086769 A1 | 5/2004 | Diez | |
| 2004/0200187 A1* | 10/2004 | Warrier | H01M 8/0232 52/782.1 |
| 2014/0170522 A1 | 6/2014 | Hotta et al. | |

(Continued)

FOREIGN PATENT DOCUMENTS

| | | |
|---|---|---|
| JP | 2001-35514 A | 2/2001 |
| JP | 2002-505512 A | 2/2002 |
| JP | 2002-319413 A | 10/2002 |

(Continued)

*Primary Examiner* — Stewart A Fraser
*Assistant Examiner* — Victoria H Lynch
(74) *Attorney, Agent, or Firm* — Foley & Lardner LLP

(57) ABSTRACT

A solid oxide fuel cell includes a plate-shaped cell with a structure in which a fuel electrode, a solid electrolyte, and an air electrode are stacked on a metal support, and current collectors which are stacked to sandwich both sides of the cell. The current collectors are in contact with both sides of the cell. The cell includes deformation guides which are easy to deform compared to other part of the cell. When the cell deforms due to thermal expansion, the cell 1 is allowed to easily deform around the deformation guides.

12 Claims, 4 Drawing Sheets

(56) References Cited

U.S. PATENT DOCUMENTS

2014/0212784 A1* 7/2014 Okuyama ........... H01M 8/0206
429/465

FOREIGN PATENT DOCUMENTS

| JP | 2003-168448 A | 6/2003 |
| JP | 2004-281172 A | 10/2004 |
| JP | 2008-53107 A | 3/2008 |
| JP | 2013-77450 A | 4/2013 |

* cited by examiner (a)

(b)

(c)

(d)

(e)

SOLID OXIDE FUEL CELL

TECHNICAL FIELD

The present invention relates to a solid oxide fuel cell.

BACKGROUND ART

A fuel cell is a device which converts chemical energy to electrical energy through an electrochemical reaction (see, for example, Patent Literature 1). A solid oxide fuel cell, which is a class of such fuel cell, has layers of a fuel electrode, a solid electrolyte, and an air electrode stacked together to serve as a power generation unit of the fuel cell, and is configured to supply the fuel electrode with a fuel gas such as hydrogen or hydrocarbon from the outside and to supply the air electrode with an oxidant gas such as air, thereby generating electricity.

In general, a cell being a power generation unit of a fuel cell is sandwiched by current collectors which collect electrons from a fuel electrode and an air electrode. Moreover, each of the current collectors functions as a separator which defines a fuel flow path and an air flow path. In addition, there is a cell that is supported on a metal support for ensuring strength to have a stack structure of the metal support, the fuel electrode, the solid electrolyte, and the air electrode.

CITATION LIST

Patent Literature

Patent Literature 1: Japanese Patent Application Publication No. 2001-35514

SUMMARY OF INVENTION

Technical Problem

In the case of rapid startup, in particular, a temperature difference can occur in the above-described solid oxide fuel cell between an outer peripheral portion (portion near the housing) of the cell and a region on the inner side of the outer peripheral portion. In that case, the cell expands due to thermal expansion. Since a periphery of the cell is supported by the housing, there is possibility that the plate-shaped cell could be warped to a large extent in a thickness direction. This warpage of the cell in the thickness direction may separate the cell and the current collector which were in contact with each other, increase an area surface resistance (ASR), and decrease an output of the fuel cell.

Given the above circumstances, the present invention aims to provide a solid oxide fuel cell which provides good contact between the cell and the current collector at rapid startup and which can control the increase in area surface resistance and the decrease in the output of the fuel cell at a moderate level.

Solution to Problem

A cell and a current collector are stacked in a solid oxide fuel cell according to the present invention. The cell is provided with a deformation guide which is easy to deform compared to other part of the cell.

Advantageous Effects of Invention

Since the cell is allowed to easily deform around the deformation guide when the cell deforms due to thermal expansion, it is possible to prevent separation between the current collector and the cell. This makes it possible to provide good contact between the cell and the current collector at rapid startup and to control the increase in area surface resistance and the decrease in the output of the fuel cell at a moderate level.

DESCRIPTION OF EMBODIMENTS

Hereinafter, embodiments of the present invention are described in detail along with the drawings.

[First Embodiment]

A solid oxide fuel cell according to a first embodiment of the present invention is described based on FIG. 1 to FIG. 4.

Figure 1:
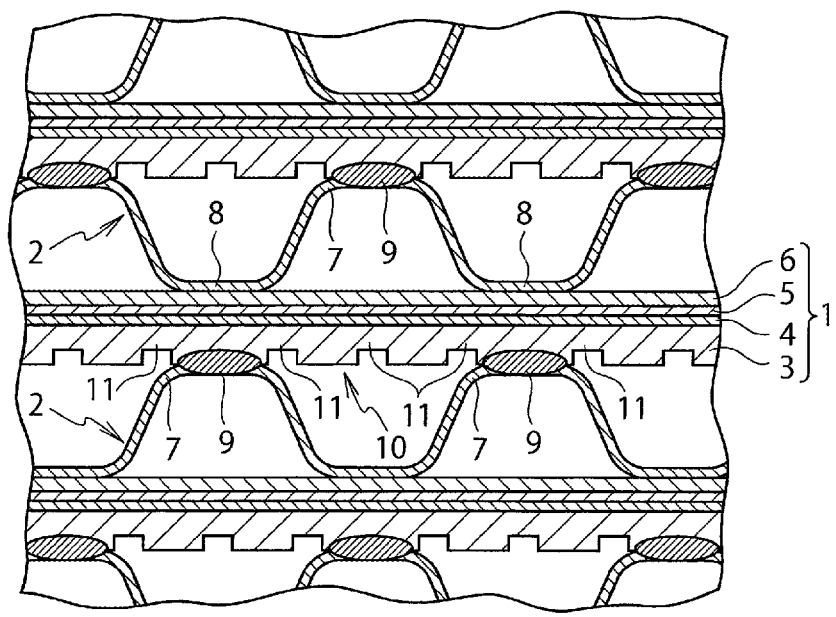
FIG. 1 is a partial cross-sectional view of a solid oxide fuel cell according to a first embodiment of the present invention.

The solid oxide fuel cell is a class of a fuel cell which is a device configured to convert chemical energy to electrical energy through an electrochemical reaction. As illustrated in FIG. 1, the solid oxide fuel cell according to the embodiment includes a cell 1 as a power generation unit of the fuel cell, current collectors 2 which collect electrons from a fuel electrode 4 and an air electrode 6 of the cell 1, and a housing (not illustrated) which houses these cell 1 and current collectors 2.

The cell 1 has a three-layer stack structure in which a solid electrolyte 5 is sandwiched between the fuel electrode (anode electrode) 4 and the air electrode (cathode electrode) 6. Moreover, these fuel electrode 4, solid electrolyte 5, and air electrode 6 are stacked on a metal support 3 for ensuring strength. To be more specific, the cell (metal-supported cell) 1 is formed in the shape of a plate as a stacked body of the metal support 3, the fuel electrode 4, the solid electrolyte 5, and the air electrode 6.

The metal support 3 is formed of a conductive material for the purpose of improving an output of the fuel cell per unit area. Also, gas permeability is required for the metal support 3 in order to supply the electrodes with a fuel gas or an oxidant gas. This metal support 3 is formed from a porous metal substrate which is made by sintering fine particles of high chromium stainless steel.

Nickel (Ni), cobalt (Co), and noble metals such as platinum (Pt) can be used as the fuel electrode 4, for example. In addition, a cermet of nickel (Ni) and a solid electrolyte can be used as the fuel electrode 4. This fuel electrode 4 is required to have characteristics such as resistance to a reducing atmosphere, permeability for a fuel gas, high electrical conductivity, and an excellent catalysis action of converting hydrogen molecules to protons.

On the other hand, powder particles of metal such as silver (Ag) and platinum (Pt) can be used as the air electrode 6, for example. In addition, oxide powder particles with a perovskite structure represented by lanthanum strontium manganite (LSM: LaSrMnO) and lanthanum strontium cobaltite (LSC: LaSrCoO) can be used as the air electrode 6. This air electrode 6 is required to have characteristics such as resistance to oxidation, permeability for an oxidant gas, high electrical conductivity, and an excellent catalysis action of converting oxygen molecules to oxygen ions.

In the air electrode 6, oxygen gas molecules decompose into oxygen ions and electrons at a three-phase interface being an active site. The oxygen ions pass through the solid electrolyte 5 and are transferred to the fuel electrode 4. Moreover, in the fuel electrode 4, fuel gas molecules and the oxygen ions transferred from the solid electrolyte 5 react with each other at the three-phase interface being likewise the active site. At this moment, electrons are emitted.

Stabilized zirconia into which yttria ($Y_2O_3$), neodymium oxide ($Nd_2O_3$), samaria ($Sm_2O_3$), gadolinia ($Gd_2O_3$), scandia ($Sc_2O_3$) or the like is solid-dissolved can be used as the solid electrolyte 5 described above, for example. In addition, oxide powder particles such as cerium oxide ($CeO_2$) based solid solution, bismuth oxide ($Bi_2O_3$), or lanthanum gallium oxide ($LaGaO_3$) can be used as the solid electrolyte 5.

The current collectors 2 are stacked to sandwich both sides of the cell 1 and are in contact with both sides of the cell 1. Moreover, each of these current collectors 2 functions as a separator which defines a fuel flow path and an air flow path between the current collectors and the cell 1. The current collectors 2 are excellent in an anti-oxidation property and are formed of a conductive material (for example, Fe alloy and SUS).

A portion of the cell 1 corresponding to an active region which contributes to power generation is formed in the shape of a wavy plate. The current collectors 2 are formed such that a contact portion 7 in contact with the metal support 3 and a contact portion 8 in contact with the air electrode 6 are arrayed alternately. Also, the stacking of the current collectors 2 is a symmetrical stack in which the contact portion 7 in contact with the metal support 3 and the contact portion 8 in contact with the air electrode 6 are at the same position with cell 1 in between. Besides, when the contact portion 7 of the current collector 2 in contact with the metal support 3 is welded, the current collectors 2 are fixed to the cell 1. A welded portion 9 is indicated with an ellipse.

Such a solid oxide fuel cell is configured to supply the fuel electrode 4 with a fuel gas such as hydrogen or hydrocarbon, and on the other hand to supply the air electrode 6 with an oxidant gas such as air or oxygen, thereby generating electricity. A stacked body in which the cells 1 and the current collectors 2 described above are stacked in multiple layers is the solid oxide fuel cell with a stack structure.

The solid oxide fuel cell according to the embodiment, in turn, includes deformation guides 10 in the cell 1. Each of these deformation guides 10 is easy to deform compared to other part of the cell 1. When the cell 1 deforms due to thermal expansion, the cell 1 is allowed to easily deform around the deformation guide 10.

The deformation guide 10 extends linearly along the contact portions 7, 8 of the current collectors 2 in contact with the cell 1, to be more specific, along a flow direction of the fuel flow path or the air flow path (direction perpendicular to the sheet of FIG. 1) on the metal support 3. The deformation guide 10 corresponds to a prefold if the cell 1 is likened to folding paper, for example. The deformation guide 10 is a structure for allowing the cell 1 to easily deform around the deformation guide 10. Since this deformation guide 10 is generally difficult to be provided in the fuel electrode 4, the solid electrolyte 5, or the air electrode 6, the deformation guide 10 is provided in the metal support 3.

The deformation guides 10 are arranged in pairs on the metal support 3 while sandwiching the contact portion 7 of the current collector 2 in contact with the metal support 3. Furthermore, the deformation guides 10 are arranged at intermediate positions on the metal support 3 between the adjacent contact portions 7, 7. Each of the deformation guides 10 of the first embodiment is a thin-thickness portion 11 which has a thickness of the metal support 3 thinner than other portions. Although not illustrated, these thin-thickness portions 11 are arranged at intervals in the flow direction of the fuel flow path or the air flow path (direction perpendicular to the sheet of FIG. 1).

Figure 3:
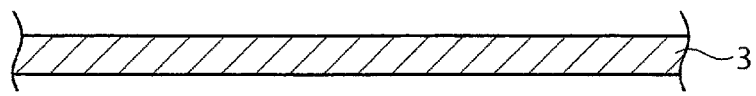
FIG. 3 is an explanatory diagram illustrating an example of a method of manufacturing the cell according to the first embodiment.
Figure 3:
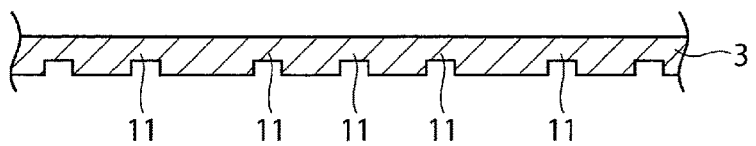
Figure 3:
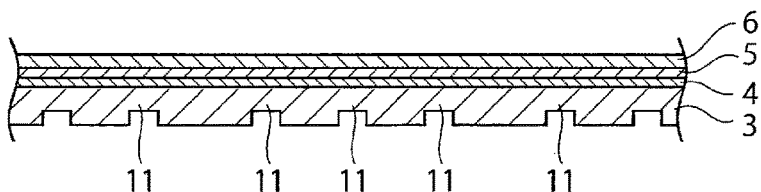
Figure 3:
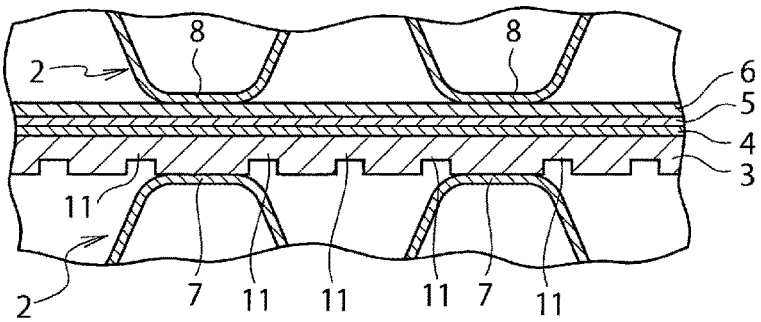
Figure 3:
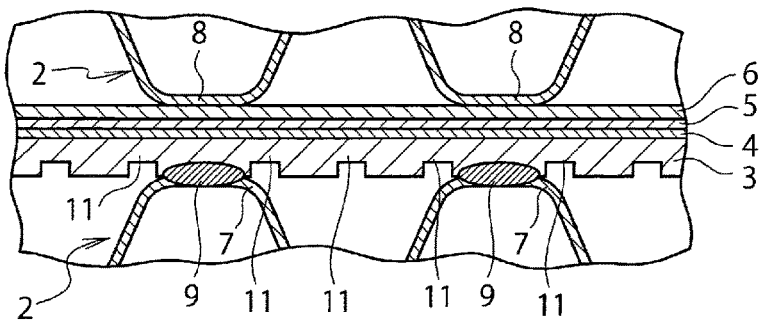

Next, an example of a method of manufacturing the cell 1 according to the first embodiment is described based on FIG. 3.

First, fine particles of high chromium stainless steel are sintered to prepare a plate-shaped metal support 3 (FIG. 3(*a*)).

Subsequently, one of the surfaces of the metal support 3 is e.g. ground or etched to form thin-thickness portions 11 (FIG. 3(*b*)). Here, some of the thin-thickness portions 11 were formed at positions outside contact portions to come into contact with the current collector 2, and the other thin-thickness portions 11 were formed at the intermediate positions between the adjacent contact portions to come into contact with the current collector 2.

Subsequently, the fuel electrode 4, the solid electrolyte 5, and the air electrode 6 are deposited on the other of the surfaces of the metal support 3 opposite to the one where the thin-thickness portions 11 are formed (FIG. 3(*c*)). Here, the solid electrolyte 5 is deposited by a sputtering method, and the air electrode 6 is deposited by a chemical solution applying method.

Subsequently, the current collectors 2 are stacked such that the contact portions 7 of the current collector 2 to come into contact with the metal support 3 and the contact portions 8 of the current collector 2 to come into contact with the air electrode 6 are opposed to each other at the same position with the metal support 3 in between (FIG. 3(*d*)).

Finally, the contact portions 7 of the current collectors 2 in contact with the metal support 3 are welded (FIG. 3(*e*)).

Hereinafter, a description is given of an experiment of measuring an area surface resistance conducted in order to demonstrate the effects of the embodiment.

[Sample]

The separator pitch of a sample is 4 mm, and the thickness of the cell is 300 μm. Needless to say, the sample has a stack structure in which the cells and the current collectors are stacked in multiple layers as illustrated in FIG. 1, and an outer peripheral surface of each cell is supported by a housing. The sample of the example includes a metal support which is provided with a deformation guide (thin-thickness portion). The sample of the comparative example includes a metal support which is not provided with a deformation guide (thin-thickness portion).

[Experiment of Measuring Area Surface Resistance]

When the temperature was rapidly increased and the temperature difference between the housing and the cell reached 300° C., the measurement of the area surface resistance was started. The rapid increase in temperature was performed by allowing a heating gas to flow through the air flow path.

[Comparison Results]

Figure 4:
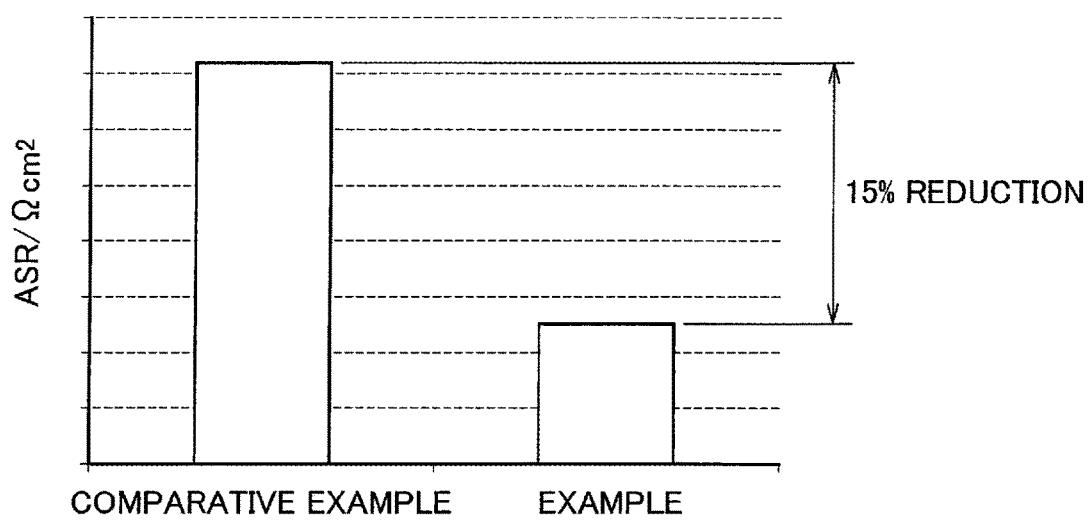
FIG. 4 is a graph illustrating an evaluation result for improvement of area surface resistance.

The effects were demonstrated by comparing an area surface resistance value for the sample according to the example and an area surface resistance value for the sample according to the comparative example. As illustrated in FIG. 4, it turned out that the area surface resistance value for the sample according to the example was lower by 15% than the area surface resistance value for the sample according to the comparative example.

[Discussions]

An observation of the sample according to the comparative example after the experiment of measuring the area surface resistance showed that the contact portions of the current collectors with the air electrode were separate from the air electrode, and there was a maximum gap of 250 μm. On the other hand, an observation in the same manner of the sample according to the example after the experiment of measuring the area surface resistance showed that the contact portions of the current collectors with the air electrode were not separate from the air electrode (see FIG. 2). To be more specific, separation between the current collectors and the cell was prevented, enabling prevention of the increase in area surface resistance.

Hereinafter, the operations and effects of the embodiment are described.

(1) The solid oxide fuel cell according to the embodiment includes the plate-shaped cell 1 with a structure in which the fuel electrode 4, the solid electrolyte 5, and the air electrode 6 are stacked on the metal support 3, and the current collectors 2 which are stacked to sandwich both sides of the cell 1. The current collectors 2 are in contact with both sides of the cell 1. The cell 1 includes a deformation guide 10 which is easy to deform compared to other part of the cell 1.

When the cell 1 deforms due to thermal expansion, the cell 1 is allowed to easily deform around the deformation guide 10, which thus makes it possible to prevent separation between the current collectors 2 and the cell 1. This makes it possible to provide good contact between the cell 1 and the current collectors 2 at rapid startup and to control the increase in area surface resistance and the decrease in the output of the fuel cell at a moderate level.

(2) The deformation guide 10 extends linearly.

Figure 2:
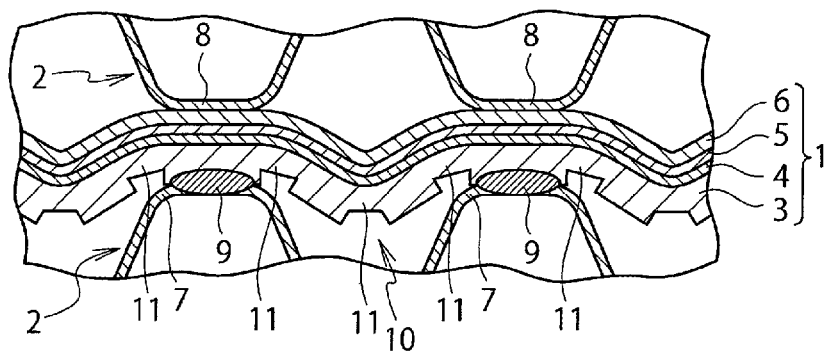
FIG. 2 is an explanatory diagram illustrating a state where a cell according to the first embodiment is deformed.

Since the deformation guide 10 extends linearly, when the cell 1 deforms due to thermal expansion, the cell 1 is allowed to easily deform around the deformation guide 10, as illustrated in FIG. 2. This thus makes it possible to more reliably prevent separation between the current collectors 2 and the cell 1 when the cell 1 deforms due to thermal expansion.

(3) The deformation guides 10 are arranged in pairs while sandwiching the contact portion 7 of the current collector 2 in contact with the cell 1 (metal support 3).

Since the deformation guides 10 are arranged in pairs while sandwiching the contact portion 7, when the cell 1 deforms due to thermal expansion, the cell 1 is allowed to easily warp with the contact portions 7, 8 of the current collectors 2 with the cell 1 as support points, as illustrated in FIG. 2. This thus makes it possible to more reliably prevent separation between the current collectors 2 and the cell 1 when the cell 1 deforms due to thermal expansion.

(4) The deformation guides 10 are arranged at the intermediate positions between the adjacent contact portions 7, 7.

Since the deformation guides 10 are arranged at the intermediate positions between the adjacent contact portions 7, 7, when the cell 1 deforms due to thermal expansion, the cell 1 is allowed to easily warp with the contact portions 7, 8 of the current collectors 2 with the cell 1 as support points, as illustrated in FIG. 2. This thus makes it possible to more reliably prevent separation between the current collectors 2 and the cell 1 when the cell 1 deforms due to thermal expansion.

(5) The deformation guide 10 is the thin-thickness portion 11 which has a thickness of the metal support 3 thinner than other portions.

Since the deformation guide 10 is the thin-thickness portion 11 which has a thickness of the metal support 3 thinner than other portions, the cell 1 is allowed to easily deform around the thin-thickness portion 11, as illustrated in FIG. 2. This thus makes it possible to more reliably prevent separation between the current collectors 2 and the cell 1 when the cell 1 deforms due to thermal expansion.

[Second Embodiment]

Figure 5:
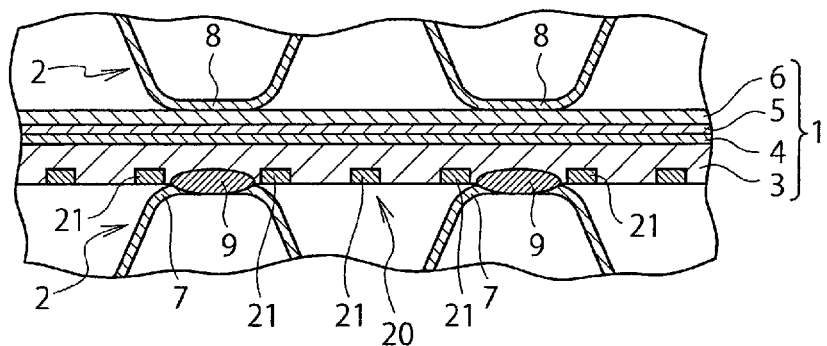
FIG. 5 is a partial cross-sectional view of a solid oxide fuel cell according to a second embodiment of the present invention.

A solid oxide fuel cell according to a second embodiment of the present invention is described based on FIG. 5. Note that the constituents identical to those of the first embodiment described above are given the same reference signs, and the explanation for those constituents is omitted.

As illustrated in FIG. 5, the solid oxide fuel cell according to the second embodiment includes deformation guides 20 in the cell 1. Each of these deformation guides 20 is easy to deform compared to other part of the cell 1. When the cell 1 deforms due to thermal expansion, the cell 1 is allowed to easily deform around the deformation guide 20.

The deformation guide 20 extends linearly along the contact portions 7, 8 of the current collectors 2 in contact with the cell 1, to be more specific, along a flow direction of the fuel flow path or the air flow path (direction perpendicular to the sheet of FIG. 5) on the metal support 3. The deformation guide 20 corresponds to a prefold if the cell 1 is likened to folding paper, for example. The deformation guide 20 is a structure for allowing the cell 1 to easily deform around the deformation guide 20. Since this deformation guide 20 is generally difficult to be provided in the fuel electrode 4, the solid electrolyte 5, or the air electrode 6, the deformation guide 20 is provided in the metal support 3.

The deformation guides 20 are arranged in pairs on the metal support 3 while sandwiching the contact portion 7 of the current collector 2 in contact with the metal support 3. Furthermore, the deformation guides 20 are arranged at intermediate positions on the metal support 3 between the adjacent contact portions 7, 7. Each of the deformation guides 20 of the second embodiment is a sparse structure portion 21 in which the porosity of the porous metal substrate constituting the metal support 3 is higher than other part. Although not illustrated, these sparse structure portions 21 are arranged at intervals in the flow direction of the fuel flow path or the air flow path (direction perpendicular to the sheet of FIG. 5). The above-described sparse structure portions 21 may be arranged continuously in the flow direction of the fuel flow path or the air flow path (direction perpendicular to the sheet of FIG. 5).

Next, an example of a method of manufacturing the cell 1 according to the second embodiment is described. Note that illustration of the method of manufacturing the cell 1 according to the second embodiment is omitted because the method is different from that of the first embodiment only in intermediate steps.

First, fine particles of high chromium stainless steel are sintered to prepare a plate-shaped metal support 3.

Subsequently, one of the surfaces of the metal support 3 is ground or etched to form grooves. Here, some of the grooves were formed at positions outside contact portions to come into contact with the current collector 2, and the other grooves were formed at the intermediate positions between the adjacent contact portions to come into contact with the current collector 2.

Moreover, the grooves described above were filled with a viscous slurry which is prepared by dispersing particles of high chromium stainless steel having a particle diameter larger than that of the metal support 3 into a viscous organic binder solution. After that, a sintering process is performed. The sparse structure portions 21 were formed on the metal support 3 through the foregoing steps.

Subsequently, the fuel electrode 4, the solid electrolyte 5, and the air electrode 6 are deposited on the other of the surfaces of the metal support 3 opposite to the one where the sparse structure portions 21 are formed. Here, the solid electrolyte 5 is deposited by a sputtering method, and the air electrode 6 is deposited by a chemical solution applying method.

Subsequently, the current collectors 2 are stacked such that the contact portions 7 of the current collector 2 to come into contact with the metal support 3 and the contact portions 8 of the current collector 2 to come into contact with the air electrode 6 are opposed to each other at the same position with the metal support 3 in between.

Finally, the contact portions 7 of the current collectors 2 in contact with the metal support 3 are welded.

Hereinafter, the operations and effects of the second embodiment are described.

The deformation guide 20 of the second embodiment is the sparse structure portion 21 in which the porosity of the porous metal substrate constituting the metal support 3 is higher than other part.

Since the deformation guide 20 is the sparse structure portion 21 in which the porosity of the porous metal substrate constituting the metal support 3 is higher than other part, the cell 1 is allowed to easily deform around the sparse structure portion 21. This thus makes it possible to prevent separation between the current collectors 2 and the cell 1 when the cell 1 deforms due to thermal expansion. In addition, since the deformation guide 20 is the sparse structure portion 21, it is possible to improve the electron paths in an inward direction of the electrode surface compared to the case where the deformation guide 20 is e.g. a notch or a groove.

[Third Embodiment]

Figure 6:
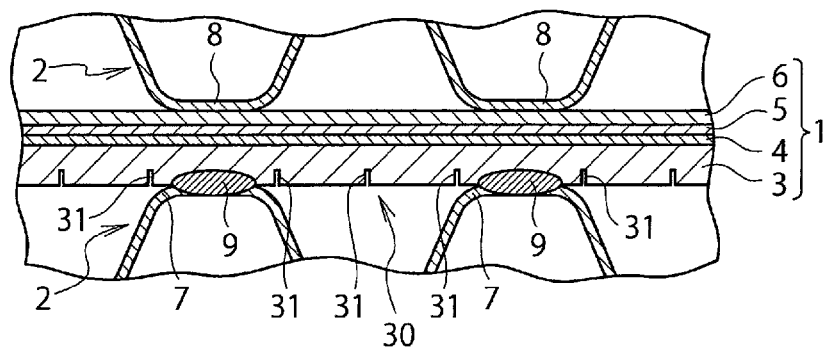
FIG. 6 is a partial cross-sectional view of a solid oxide fuel cell according to a third embodiment of the present invention.

A solid oxide fuel cell according to a third embodiment of the present invention is described based on FIG. 6. Note that the constituents identical to those of the first embodiment described above are given the same reference signs, and the explanation for those constituents is omitted.

As illustrated in FIG. 6, the solid oxide fuel cell according to the third embodiment includes deformation guides 30 in the cell 1. Each of these deformation guides 30 is easy to deform compared to other part of the cell 1. When the cell 1 deforms due to thermal expansion, the cell 1 is allowed to easily deform around the deformation guide 30.

The deformation guide 30 extends linearly along the contact portions 7, 8 of the current collectors 2 in contact with the cell 1, to be more specific, along a flow direction of the fuel flow path or the air flow path (direction perpendicular to the sheet of FIG. 6) on the metal support 3. The deformation guide 30 corresponds to a prefold if the cell 1 is likened to folding paper, for example. The deformation guide 30 is a structure for allowing the cell 1 to easily deform around the deformation guide 30. Since this deformation guide 30 is generally difficult to be provided in the fuel electrode 4, the solid electrolyte 5, or the air electrode 6, the deformation guide 30 is provided in the metal support 3.

The deformation guides 30 are arranged in pairs on the metal support 3 while sandwiching the contact portion 7 of the current collector 2 in contact with the metal support 3. Furthermore, the deformation guides 30 are arranged at intermediate positions on the metal support 3 between the adjacent contact portions 7, 7. Each of the deformation guides 30 of the third embodiment is a groove portion 31 provided in the surface of the metal support 3. Although not illustrated, these groove portions 31 extend continuously in the flow direction of the fuel flow path or the air flow path (direction perpendicular to the sheet of FIG. 6).

Explanation of the method of manufacturing the cell 1 according to the third embodiment is omitted because the method is almost the same as that of the first embodiment.

Hereinafter, the operations and effects of the third embodiment are described.

The deformation guide 30 of the third embodiment is the groove portion 31 provided in the surface of the metal support 3.

Since the deformation guide 30 is the groove portion 31 provided in the surface of the metal support 3, the cell 1 is allowed to easily deform around the groove portion 31. This thus makes it possible to prevent separation between the current collectors 2 and the cell 1 when the cell 1 deforms due to thermal expansion.

The foregoing description of the embodiments has provided the details of the present invention. However, the present invention is not limited to the above description. It is obvious to those skilled in the art that various modifications and improvements can be made to the present invention.

In the above embodiments, the three-layer stack structure of the fuel electrode 4, the solid electrolyte 5, and the air electrode 6 is made such that the fuel electrode 4 is stacked in contact with the metal support 3, but the embodiments are not limited to this. For example, the air electrode 6 may be stacked in contact with the metal support 3. In addition, it is possible to use in combination the deformation guide 10 (thin-thickness portion 11) of the first embodiment, the deformation guide 20 (sparse structure portion 21) of the second embodiment, and the deformation guide 30 (groove portion 31) of the third embodiment.

REFERENCE SIGNS LIST 1 cell
2 current collector
3 metal support
4 fuel electrode
5 solid electrolyte
6 air electrode
7 contact portion
8 contact portion
10 deformation guide
11 thin-thickness portion
20 deformation guide
21 sparse structure portion
30 deformation guide
31 groove portion

The invention claimed is:

1. A solid oxide fuel cell comprising:
    a plate-shaped cell with a structure in which a fuel electrode, a solid electrolyte, and an air electrode are stacked on a metal support;
    a first current collector including a plurality of first contact portions in contact with the plate-shaped cell in a direction perpendicular to a stacking direction of the plate-shaped cell, and
    a second current collector located on an opposite side of the plate-shaped cell to the first current collector and which includes a plurality of second contact portions in contact with the plate-shaped cell in the direction perpendicular to the stacking direction of the plate-shaped cell, wherein
    the plurality of first contact portions and the plurality of second contact portions all have an overlapping region in the stacking direction of the plate-shaped cell, and
    the metal support includes a plurality of deformation guides around which the plate-shaped cell is configured to deform when the plate-shaped cell deforms due to thermal expansion, and
    the plurality of deformation guides are disposed in pairs such that a pair of deformation guides sandwiches each of the first contact portions.

2. The solid oxide fuel cell according to claim 1, wherein the plurality of deformation guides extend linearly.

3. The solid oxide fuel cell according to claim 1, wherein each of the plurality of deformation guides is disposed at an intermediate position between adjacent two of the first contact portions.

4. The solid oxide fuel cell according to claim 1, wherein each of the plurality of deformation guides comprises a thin-thickness portion where a thickness of the metal support is thinner than other portions thereof.

5. The solid oxide fuel cell according to claim 1, wherein the metal support is formed from a porous metal substrate, and
    each of the plurality of deformation guides comprises a sparse structure portion in which a porosity of the porous metal substrate is higher than other constituents.

6. The solid oxide fuel cell according to claim 1, wherein each of the plurality of deformation guides comprises a groove portion provided in a surface of the metal support.

7. The solid oxide fuel cell according to claim 1, wherein the metal support is formed from a porous metal substrate,
    each of the plurality of deformation guides include a sparse structure portion in which a porosity of the porous metal substrate is higher than other constituents, and
    the sparse structure portion is arranged between adjacent two of the first contact portions in a surface of the metal support opposite to a surface on which the fuel electrode, the solid electrolyte, and the air electrode are stacked.

8. The solid oxide fuel cell according to claim 1, wherein each of the plurality of deformation guides comprises a recess formed in a surface of the metal support facing the first current collector and the plurality of first contact portions thereof.

9. The solid oxide fuel cell according to claim 1, wherein the plurality of first contact portions of the first current collector contact the metal support of the plate-shaped cell, and
    the plurality of second contact portions of the second current collector contact the air electrode of the plate-shaped cell.

10. The solid oxide fuel cell according to claim 1, wherein the plurality of deformation guides are formed in a surface of the metal support that does not contact the fuel electrode, the solid electrolyte, and the air electrode.

11. The solid oxide fuel cell according to claim 1, wherein the fuel electrode directly contacts a first surface of the metal support, and
    the plurality of deformation guides are formed in a second surface of the metal support opposite to the first surface.

12. A solid oxide fuel cell comprising:
    a plate-shaped cell with a structure in which a fuel electrode, a solid electrolyte, and an air electrode are stacked on a metal support;
    a first current collector including a plurality of first contact portions in contact with the plate-shaped cell in a direction perpendicular to a stacking direction of the plate-shaped cell, and
    a second current collector located on an opposite side of the plate-shaped cell to the first current collector and which includes a plurality of second contact portions in contact with the plate-shaped cell in the direction perpendicular to the stacking direction of the plate-shaped cell, wherein
    the metal support includes a plurality of deformation guides around which the plate-shaped cell is configured to deform when the plate-shaped cell deforms due to thermal expansion, and
    the plurality of deformation guides are disposed in pairs such that a pair of deformation guides sandwiches each of the first contact portions.

* * * * *